Patented July 6, 1943

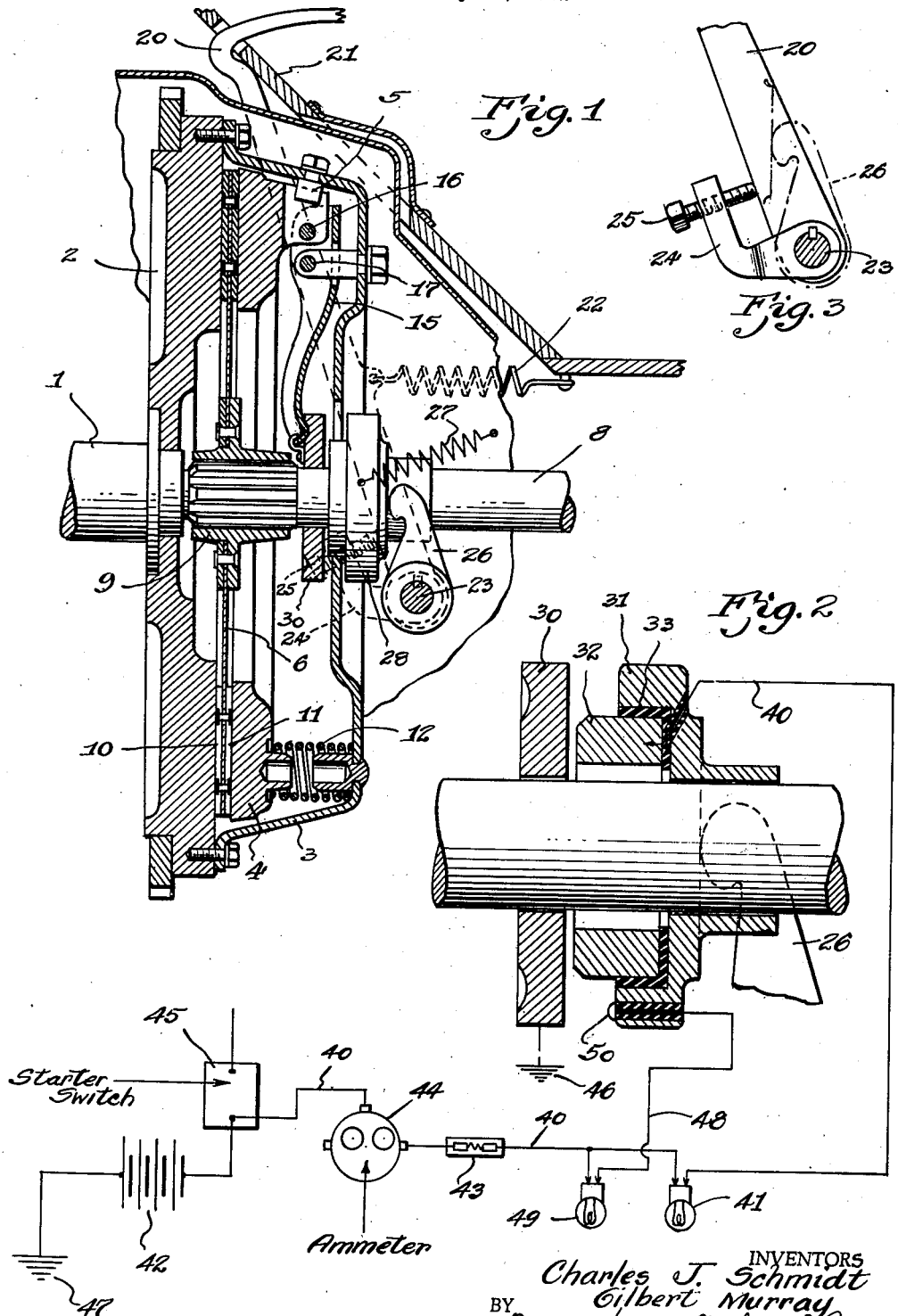

2,323,489

UNITED STATES PATENT OFFICE 2,323,489

CLUTCH CONTROL

Charles J. Schmidt, Roselle Park, and Gilbert Murray, Newark, N. J.

Application May 14, 1942, Serial No. 442,916

3 Claims. (Cl. 192—110)

This invention relates to friction clutches where one or more driven members are packed with pressure between driving members to establish a driving connection in a power line. The invention is concerned particularly with a friction clutch where friction facings are used which are subject to wear.

Clutches of this type are commonly used in various sorts of automotive vehicles, such as passenger cars, trucks, tractors, and tanks or the like. For the purpose of making the disclosure herein, an arrangement is shown which depicts a clutch construction in an automotive vehicle, although it will be understood that the invention may be employed wherever such a clutch is used.

As the clutch facings wear in use and become thinner, the axially movable driving member approaches closer and closer to a fixed driving member with resultant shifting of the position of the controlling lever or pedal. Any obstruction which may be in the way of the lever or pedal, such as to prevent it from assuming its shifted position, may block the free engaging action of the clutch. This will result in only a partial clutch engagement so that the driving and driven members will slip relative to each other and cause undue wear and ultimate destruction of the friction facings.

The principal object of the invention is to provide a signal arrangement for imparting intelligence to an operator when the above undesirable condition obtains. Thus, if the clutch is not engaged under complete packing pressure because of obstruction of an operating part, a signal is given to warn the operator that an adjustment must be made.

A further object of the invention is to provide a signal arrangement for conveying to the operator the intelligence that a clutch operating member is worn to the point where it must be replaced, this arrangement being suitable for use where the clutch releasing member is of the friction type.

The drawing illustrates a clutch and arrangement for carrying out the invention.

In this drawing:

Fig. 1 is a cross sectional view illustrating a rather conventional form of friction clutch.

Fig. 2 is a view illustrating an enlarged view of the clutch release bearing and the signal arrangement.

Fig. 3 is a view showing the means for shifting the throw-out bearing.

The clutch illustrated in Fig. 1 is shown as being mounted in an automotive vehicle. The engine shaft is shown at 1 and the flywheel is at 2. A cover plate 3 is attached to the flywheel and a pressure plate is shown at 4. This pressure plate is slidably keyed to the cover plate as at 5 so that it rotates with the cover plate and flywheel and is axially shiftable for clutch control. A driven disc 6 is mounted upon a driven shaft 8 through the means of a splined hub 9 and this driven disc is provided with friction facings 10 and 11 on opposite sides thereof which are frictionally engaged and packed between the faces of the flywheel and the pressure plate. Clutch engagement is effected by any suitable means as, for example, an annulus of coil springs positioned between the cover plate and the pressure plate, one of which is shown at 12.

For operating the pressure plate, suitable mechanism is provided, and as shown herein this takes the form of a plurality of levers, one of which is shown at 15. Each lever is pivotally connected to the pressure plate as at 16 and to a bracket 17 in turn mounted on the cover plate. It will be at once appreciated that if the levers are caused to swing around their fulcrum point 17 so that the lever 15 shown in Fig. 1 shifts clockwise, that the pivot point 16 is shifted to the right and the pressure plate retracted against the action of the packing springs and the clutch thereby released. To perform this latter function there is a clutch lever 20 in the form of a pedal which extends through the floor boards 21 of the vehicle and which is held retracted by a relatively light retracting spring 22. This lever is fulcrumed on a throw-out shaft 23 while secured to the shaft is an arm 24 having an adjustable contact with the lever 20 as by means of an adjusting screw 25. Also secured to the throw-out or rock shaft is a yoke 26 for contacting a throw-out bearing 28. This bearing is arranged to shift the clutch release levers to which end the levers may be provided with a contact or thrust member 30 or, on the other hand, the throw-out bearing 28 may make direct contact with the inner ends of the throw-out levers. The bearing 28 may be held retracted by a relatively light spring 27.

As shown in Fig. 2 the throw-out bearing has a suitable casing 31 which may be metal for containing a block of ring form of suitable friction material, such as a carbon composition 32, for direct contact with the throw-out member 30. This carbon block is insulated from the carrier 31 as at 33. It will be observed that if the pedal 20 is depressed, the throw-out bearing is shifted to the left as the figures are viewed, by the yoke 26, the carbon bearing 32 engages the throw-out member or collar 30 and the levers are rocked to release the clutch. When the pressure is removed from the pedal, the springs 12 cause clutch engagement. The retractor spring 22 pulls the pedal 20 back against a suitable stop, such as the floor boards, as illustrated, and in a normal and properly adjusted installation the members 30 and 32 are spaced apart when the clutch is engaged. This clearance, however, is quite small. As the facings 10 and 11 wear and become thinner in use, the position of the inner tips of the levers 15 or the throw-out member or collar 30 gradually shifts to the right in the full clutch engaged position. Eventually this takes up all the clearance between the members 30 and 32. When conditions become bad the packing springs 12 exert a pressure through the levers 15, through the throw-out bearing and to the toe boards, resulting in the fact that the driven member is packed between the flywheel and the pressure plate with only a portion of the total packing pressure. If this condition is allowed to remain for any appreciable length of time, it becomes worse and worse with resultant slippage of the clutch and an unduly rapid wearing away of the facings. The signal arrangement is designed to impart to the operator the intelligence that this undesirable condition exists. To this end an electric lead line, or conductor 40, insulated from the carrier 31, is connected to the block 32. This lead line extends through a lamp 41 and then to a suitable source of electrical energy illustrated at 42. It may be advantageous to run this line through a fuse 43 and through an ammeter 44 and it preferably connects to the power source through the engine starter switch as shown at 45. The throw-out member or collar 30 is grounded as at 46 and, of course, the opposite side of the source of electrical energy is grounded as at 47.

In the normal clutch engaged position the clutch release bearing 32 and the throw-out member or collar 30 are normally spaced apart as shown in Fig. 2. Any time the clutch is disengaged, by shifting of the lever 20, the circuit is closed by the contact between the members 30 and 32 and the lamp 41 is energized, thus giving a signal. As the facings wear and the member 30 gradually shifts to the right in clutch engaged position, it will eventually maintain a contact with the bearing 32 with the result that the lamp 41 will remain energized and will not cease its glowing, even though the clutch is engaged. The operator now knows that an adjustment must be made to again provide for clearance between the members 30 and 32. One form of adjustment is that comprising the members 24 and 25, and it may be made by backing away the screw 25.

Where the member 32 is of the friction block type as shown, and is subject to wear, it may also be desirable to provide a signal indicating that the block 32 has worn to a point where it should be replaced. The carrier 31 is provided with a contact 50 and a conductor 48 which is insulated from the carrier extends from the contact to the lamp 49 and which lamp is connected to the line 40. The insulating of the contact and lead 48 from the carrier 31 makes it unnecessary to insulate the carrier bodily from other metallic parts. When the bearing 32 has been worn away, the throw-out member or collar 30 will make direct contact with the contact member 50. This closes a circuit through the line 48 and energizes the signal lamp 49. When this condition exists it may be that both the lamps 41 and 49 will remain incandescent. This latter arrangement, however, need not be employed where the bearing for engaging the throw-out member 30 is of the anti-friction type and is, therefore, not subject to any substantial wear.

We claim:

1. In combination with a friction clutch having driving and driven members including friction facings subject to wear, one of the members being axially shiftable for clutch release and engagement, means for packing the members together for clutch engagement, release means operable to shift the said shiftable member for clutch release, a thrust member for cooperation with the release means, a control member operable to shift the thrust member for clutch release, said control member having a substantially fixed position when the clutch is engaged with the release means and thrust member spaced apart, an adjustable connection between the thrust member and the control member; an electrical indicating lamp, a circuit therefor, said circuit including and running through the release means and the thrust member whereby the circuit is closed and the lamp energized when the release means and thrust member are in contact with each other, and whereby the circuit remains closed when the facings are worn to a point where the release means remains in contact with the thrust member when the clutch is engaged to show the necessity of adjusting said adjustable connection to re-establish a normal spacing between the release means and the thrust member during clutch engagement.

2. In combination with a friction clutch having driving and driven members including friction facings subject to wear, means for packing the members together for clutch engagement, release means operable to shift at least one of the members for clutch release, a thrust member operable to contact the release means and to shift the same for clutch release, said thrust member having a substantially fixed position when the clutch is engaged, in which position the release means and thrust member are spaced apart, adjustable means for varying the said fixed position of the thrust member; an electrical indicating lamp, a circuit therefor, said circuit including and running through the release means and thrust member whereby the circuit is closed when the release means and thrust member are in contact, and whereby the release means and thrust member remain in contact during clutch engaged position when the facings are worn to the extent that the release means is caused to follow the thrust member to its said fixed position to show the necessity of adjusting the said fixed position of the thrust member to re-establish a normal spacing between the release means and the thrust member during clutch engagement.

3. In combination with a friction clutch having driving and driven members including friction facings subject to wear, means for packing the members together for clutch engagement, release means operable to shift at least one of the members for clutch release, a thrust member for cooperation with the release means for shifting the release means for clutch disengagement, said thrust member having a friction type thrust portion and a carrier therefor, the thrust member having a fixed position when the clutch is engaged with the release means and thrust portion spaced apart, adjustable means for varying the said fixed position of the thrust member; an electrical indicating lamp, a circuit therefor, said circuit including and running through the release means and the thrust portion, whereby when the facings are worn to an extent that the release means and thrust member remain in contact when the clutch is engaged, the circuit remains energized and the lamp indicates the necessity for adjusting the fixed position of the thrust member to re-establish a normal spacing during clutch engagement, a second electrical indicating lamp, a circuit therefor running through and including the carrier and the release means whereby when the thrust portion is worn to such an extent that the release means contacts with the carrier, the second circuit is energized and its lamp indicates the necessity for the repair or replacement of the thrust portion.

CHARLES J. SCHMIDT.
GILBERT MURRAY.